US012714645B2

(12) United States Patent
Geßner et al.

(10) Patent No.: US 12,714,645 B2
(45) Date of Patent: Aug. 25, 2026

(54) PILL CARRIER FOR THE INTERMEDIATE TRANSPORT OF PILLS IN A BLISTER PACKAGING PROCESS, FILLING DEVICE FOR A PILL CARRIER AND METHOD FOR FILLING A PILL CARRIER

(71) Applicant: KNAPP AG, Hart bei Graz (AT)

(72) Inventors: Jürgen Geßner, Munich (DE); Andreas Lang, Mainz (DE); Torsten Vest, Bischofsheim (DE); Raffael Engel, Saarbrücken (DE)

(73) Assignee: KNAPP AG, Hart bei Graz (AT)

(*) Notice: Subject to any disclaimer, the term of this patent is extended or adjusted under 35 U.S.C. 154(b) by 0 days.

(21) Appl. No.: 18/855,002

(22) PCT Filed: Apr. 6, 2023

(86) PCT No.: PCT/EP2023/059156
§ 371 (c)(1),
(2) Date: Oct. 8, 2024

(87) PCT Pub. No.: WO2023/194542
PCT Pub. Date: Oct. 12, 2023

(65) Prior Publication Data

US 2025/0161161 A1 May 22, 2025

(30) Foreign Application Priority Data

Apr. 8, 2022 (DE) ......................... 102022108590.2
Jun. 3, 2022 (DE) ......................... 102022114115.2

(51) Int. Cl.
*A61J 1/03* (2023.01)
*B65B 1/04* (2006.01)
(Continued)

(52) U.S. Cl.
CPC .................. *A61J 1/03* (2013.01); *B65B 1/04* (2013.01); *B65B 11/52* (2013.01); *B65B 35/20* (2013.01); *A61J 2205/00* (2013.01)

(58) Field of Classification Search
CPC ........... A61J 1/03; A61J 2205/00; B65B 1/04; B65B 11/52; B65B 35/20; B65B 5/106;
(Continued)

(56) References Cited

U.S. PATENT DOCUMENTS 4,706,440 A * 11/1987 Bittner .................. B65B 39/007
53/438
6,581,356 B2 * 6/2003 Kim ........................ G07F 11/44
221/124
(Continued)

FOREIGN PATENT DOCUMENTS

EP 1916187 B1 5/2010
EP 2993133 A1 3/2016
(Continued)

OTHER PUBLICATIONS

International Search Report and Written Opinion in PCT Application No. PCT/EP2023/059156; mailed on Aug. 16, 2023.

*Primary Examiner* — Linda J. Hodge
(74) *Attorney, Agent, or Firm* — Howard IP Law Group

(57) ABSTRACT

A pill carrier for the intermediate transport of pills in a blister packaging process, wherein the pill carrier has a base body and a plurality of recesses, wherein the respective recess is limited by limiting walls and exhibits a bottom opening, wherein a receiving body is provided in the respective recess, the receiving body exhibiting a receiving space for receiving one or a small number of pills, the receiving space exhibiting an opening on one side which allows the pill to be introduced into the receiving space, and the receiving body being arranged in the recess so as to be pivotable about a pivot pivotally mounted in the recess,
(Continued)

wherein the receiving body can be pivoted from a closed position, in which the opening is located opposite a limiting wall and is thereby closed, into an open position, in which the opening is at least partially aligned with the bottom opening.

10 Claims, 7 Drawing Sheets

(51) Int. Cl.
*B65B 11/52* (2006.01)
*B65B 35/20* (2006.01)

(58) Field of Classification Search
CPC ... B65B 5/103; B65B 39/007; B65B 69/0058; B65B 69/0041; B65B 69/0033
USPC ......... 53/258, 473, 474, 475, 168, 237, 240, 53/249, 246
See application file for complete search history.

(56) References Cited

U.S. PATENT DOCUMENTS

| | | | | |
|---|---|---|---|---|
| 7,431,160 | B2 * | 10/2008 | Drought | A61J 1/035 221/88 |
| 8,915,051 | B1 | 12/2014 | Mcgonagle et al. | |
| 2009/0120042 | A1 * | 5/2009 | Zieher | B65B 51/148 53/494 |
| 2014/0241839 | A1 * | 8/2014 | Beck | B65B 69/0058 414/412 |
| 2016/0278295 | A1 * | 9/2016 | Johnson | B65B 35/20 |

FOREIGN PATENT DOCUMENTS

| | | | | |
|---|---|---|---|---|
| KR | 102053743 | B1 | 12/2019 | |
| WO | 2014108402 | A1 | 7/2014 | |
| WO | WO-2017021928 | A2 * | 2/2017 | G06F 9/451 |

* cited by examiner

PILL CARRIER FOR THE INTERMEDIATE TRANSPORT OF PILLS IN A BLISTER PACKAGING PROCESS, FILLING DEVICE FOR A PILL CARRIER AND METHOD FOR FILLING A PILL CARRIER

CROSS-REFERENCE TO RELATED APPLICATIONS

This application is a national stage application under 35 U.S.C. § 371 of International Patent Application No. PCT/EP2023/059156 filed on Apr. 6, 2023, which claims priority 10 2022 108 590.2 filed on Apr. 8, 2022, and DE 10 2022 114 115.2, filed on Jun. 3, 2022, the subject matter of which is incorporated by reference herein in its entirety for all purposes.

FIELD OF INVENTION

The invention relates to a pill carrier for the intermediate transport of pills in a blister packaging process. The invention also relates to a filling device for a pill carrier. The invention also relates to a method for filling a pill carrier.

BACKGROUND

From EP 2 993 133 A1, a system and a method for repackaging medications from the respective original blisters into blister packs referred to there as "Befüllblister" are known. In the method described therein, blister carriers are used that are suitable for use as a receptacle for an original blister pack containing medication. These blister carriers are shown as examples in FIGS. 2 and 3 of EP 2 993 133 A1. In the method described therein, the original blister packs are placed in the blister carrier and the blister carrier is then placed in the repackaging system. The outer packaging system ensures that the blister carrier arrives at a deblistering position, where the respective medication is pushed out of the original blister by means of a suitable ejection tappet, in order to then be ejected into compartments of a pre-dosing magazine. For the implementation of the method described therein, EP 2 993 133 A1 proposes to provide blister carriers for all desired medications, whereby different medications with similarly shaped original blister packs could be assigned to identical blister carriers.

With the approach described in EP 2 993 133 A1 of assigning different medications with similarly shaped original blister packs to identical blister carriers, there is a risk that the only approximate fit of the original blister pack to the blister carrier will cause problems when pushing out the pills. The carrier must guide the pill closely so that the punch only pushes the pill through the aluminum foil and does not push out all the surrounding blister material at the same time, which would hinder the tearing of the aluminum foil. At the same time, however, the carrier must leave enough space for the pre-perforation of the foil by a needle, which is also provided for in EP 2 993 133 A1, to be carried out reliably and without damaging the pill. As a result, a separate blister carrier has to be designed and manufactured for each original blister pack. The multiple use of a blister carrier for different medications with only similarly, but not identically shaped original blister packs, as proposed in EP 2 993 133 A1, has not been adopted.

If we now assume that, contrary to the proposal of EP 2 993 133 A1, a separate blister carrier is to be provided for each original blister pack in practice, then further problems arise. If a filling order is placed for a new patient, it is not uncommon for new medications to be required as well. In Germany alone, 103,700 drugs are approved, including 48,300 prescription drugs. A blister packaging company usually has about 1,000 to 4,000 different drugs in stock. For the new drug, new blister carriers specifically tailored to the specific original blister packaging are typically required. The procurement of such a special blister carrier often takes longer than the patient can wait for his medication. In addition, there are pills that are delivered not in blisters but loose, as bulk material in bottles. Furthermore, it happens in practice that doctors prescribe half pills. However, half pills are not delivered in original blisters. Furthermore, there is a risk that some pill types may be easily destroyed or damaged when pressed through a punch, despite being pre-perforated.

In all these cases, in which human contact may be required in the repackaging process, there is a risk that the effect of a reliable, monitored and without human contact, is lost or these disadvantages lead to the fact that the blister operation with the system according to EP 2 993 133 A1 cannot be used and the relevant orders have to be rejected. In addition, individual pills that cannot be filled must be added later. If a pill is broken, the compartment must be emptied, cleaned, and a new, unbroken pill must be entered along with the old one. Furthermore, individual pills must be dispensed outside of the normal logistics flow. In addition, work is then carried out with open pills, which requires appropriate room conditions (clean room). Furthermore, the necessity of providing a specific blister carrier for each specific original blister pack means that a large number of different blister carriers have to be kept in stock, resulting in high costs and a high space requirement.

In this context, the task was to further expand the fields of application of the method and the system described in EP 2 993 133 A1. In particular, it should be possible to feed special pills into the system in such a way that the system, consisting of storage, conveyor technology, ejection mechanism, etc., can remain untouched and there is no need for "side channels".

SUMMARY

The invention is based on the idea of creating a pill carrier for the intermediate transport of pills in a blister packaging process. The pill carrier according to the invention can, for example, be used in the method and in the system known from EP 2 993 133 A1 as a supplement to the blister carriers described therein. With the pill carrier according to the invention, it is possible to provide medication that is available in original blister packs, for which there is currently no blister carrier, or medication that is not supplied in blister packs but, for example, in loose form, in the pill carrier according to the invention for the intermediate transport of pills instead of in a blister carrier that still has to be created separately. The invention is also suitable for original blisters that are too large for existing systems. The invention is also suitable for pills that are prone to breakage. The invention is also suitable for partial pills (i.e. half pills, which are not usually contained in original blisters). The pill carrier can then be used permanently for pills that are not supplied in original blister packs at all. For the medications that are provided in original blister packs, but for which no suitable pill carrier is available at the time, the pill carrier according to the invention can be used as a bridging technology to bridge the time until the blister carrier tailored to the respective original blister pack is available. The pill carrier according to the invention is more complicated than the use of a blister carrier that is adapted to the original blister packaging. While the blister carrier described in EP 2 993 133 A1 allows the original blister packaging to be placed in the blister carrier with just a few steps and the lid of the blister carrier to be closed so that the is then immediately ready for use, it is necessary to load the pill carrier according to the invention by placing the pills individually into the respective receiving space of the receiving body of the pill carrier according to the invention. Among other things, this may mean that the medication must first be removed from the original blister packaging, and then may even have to be divided, in order to be placed in the respective receiving space of the receiving body of the pill carrier. However, these disadvantages of the pill carrier according to the invention compared to the blister carrier described in EP 2 993 133 A1 only exist as long as there is actually an associated blister carrier for an original blister pack. If no such blister carrier is available at the time in question, the pill carrier according to the invention offers the advantage that the method can still be carried out and there is no need to wait until the associated blister carrier becomes available.

The pill carrier according to the invention is suitable for the intermediate transport of pills in a blister packaging process. The reference to this suitability is intended to emphasize that an essential suitability of the pill carrier is to transport the pills arranged in it to a blistering system so that they can then be removed from the pill carrier and used in the further blistering process. However, the reference to the suitability of the pill carrier for the intermediate transport of pills in a blister packaging process does not preclude the pill carrier from being used for the temporary intermediate storage of pills in addition to its suitability for the intermediate transport of pills. EP 2 993 133 A1 describes, with reference to FIGS. 1A and 1B, possibilities for the intermediate storage of blister carriers in a drawer storage system 50 with extendable drawers 52. A pill carrier filled with pills according to the invention can also be used for intermediate storage in such a warehouse. Equally, embodiments are conceivable in which the pill carrier according to the invention is stored in an overflow storage area.

The pill carrier according to the invention exhibits a base body. The base body essentially determines the shape of the pill carrier. The shape of the base body is adapted to how the pill carrier according to the invention is to be handled within a blister packaging process and, in particular, how it is to be handled within a blister packaging system. If the pill carrier according to the invention is used, for example, in the system described in more detail in EP 2 993 133 A1, the design of the base body of the pill carrier can be used to fulfil the design criterion described in EP 2 993 133 A1, according to which the external dimensions of all blister carriers should be standardized, preferably identical. By suitably selecting the shape of the base body, the pill carrier according to the invention can be adapted in shape to existing forms of blister carriers of a system according to EP 2 993 133 A1. In particular, the pill carrier according to the invention can exhibit a label or a writable chip, by means of which the content can be unambiguously linked to the carrier in the EDP or all information about the medication can be written to the chip.

According to a preferred embodiment, the base body is made of plastic. In this case, the base body can be, for example, a cast body, preferably an injection-moulded body. It is also conceivable that the base body is produced by moulding from a plastic block, for example by cutting processes such as milling, planning or drilling.

The pill carrier according to the invention comprises a plurality of recesses, wherein the respective recess is limited by limiting walls and exhibits a bottom opening.

Just as the blister carriers from EP 2 993 133 A1 are designed to transport several pills, namely the number of pills that are provided in the original blister pack, the pill carrier according to the invention should also be designed in a preferred embodiment to transport several pills in separately controllable recesses and to make them available in the blistering process. Therefore, the pill carrier provides for a plurality of recesses. In a preferred embodiment, the pill carrier has more than two recesses, more particularly more than three recesses, more particularly more than five recesses and more particularly more than seven recesses. In a preferred embodiment, the pill carrier exhibits fewer than 200 recesses, more particularly fewer than 100, more particularly fewer than 50, more particularly fewer than 25, more particularly fewer than 20 recesses.

The present description describes the recesses of the pill carrier that are intended to hold a receiving body, since the receiving body with its receiving space is the location in which the pill is located. This focus on this type of recess in the pill carrier according to the invention does not preclude the pill carrier according to the invention from also exhibiting further recesses that serve other functions, for example, the pill carrier can exhibit recesses into which pins can be inserted for transporting the pill carrier, for example for pushing it along a rail. For stacking pill carriers according to the invention, it is also conceivable that projections are provided on one side of the base body of the respective pill carrier and recesses are provided on the opposite side, so that several pill carriers can be stacked on top of each other in such a way that the respective projection of one pill carrier engages in the respective recess of the other pill carrier. The projections can be designed as stacking pins. The projections, in particular the stacking pins, can be distributed asymmetrically over the pill carrier so that the orientation can be checked or forced by a simple connecting link on a conveyor system.

The recesses in the pill carrier intended to receive the receiving body are each limited by limiting walls. There are conceivable embodiments in which a single, peripheral limiting wall surrounding the recess is provided without corners. In a preferred embodiment, however, a recess is limited by limiting walls that run at an angle to each other and adjoin each other in corners. In a preferred embodiment, a recess is limited by four limiting walls that adjoin each other in corners, for example in the manner of a shaft.

The respective recess exhibits a bottom opening. An opening is understood to be a bottom opening if it is provided in a surface of the base body, for example in a bottom surface of the base body. In a preferred embodiment, the bottom opening exhibits a cross-sectional area that is large enough and is adapted in terms of its shape so that a pill can pass through the bottom opening. In a preferred embodiment, the bottom opening is square, rectangular, polygonal, triangular, elliptical or circular. In a preferred embodiment, the bottom opening exhibits a cross-sectional area of more than 5 $mm^2$, more preferably more than 25 $mm^2$, still more preferably more than 100 $mm^2$. In a preferred embodiment, the bottom opening exhibits a cross-sectional area of less than 400 $mm^2$, more preferably less than 300 $mm^2$, more preferably less than 200 $mm^2$.

The invention provides for a receiving body to be provided in the respective recess. The receiving body exhibits a receiving space for receiving one or a small number of pills. In this context, a small number of pills is to be understood as in particular preferably the number of 10 pills, in particular preferably the number of 7 pills, in particular preferably the number of 5 pills. In a particularly preferred embodiment, the receptacle is designed to hold only one or two pills. In a particularly preferred embodiment, the receptacle is designed to hold only a single pill. In a particularly preferred embodiment, the receptacle is designed to hold only a piece of a pill, for example half a pill, a quarter of a pill, or an eighth of a pill.

The size of the receiving space of the receiving body can be selected depending on the desired use of the pill carrier. If the pill carrier is intended to be used as a direct replacement for a blister carrier according to EP 2 993 133 A1, it is useful to select the receiving space so that it can only hold one pill. In this way, the receiving space reflects the arrangement of the one medication in the one pocket (in the one blister pocket) of the original blister packaging. However, embodiments are also conceivable in which the pill carrier is used for pre-packing and several pills are arranged in one receiving space. The use of the pill carrier according to the invention makes it necessary in any case for it to be filled separately. Instead of placing a single pill in each of a large number of individual pill carriers in the receiving space, and then, for example, emptying these pill carriers individually back into the compartments of the pre-dosing magazine as part of the method according to EP 2 993 133 A1, it could also make sense in a preferred embodiment to arrange several pills in a receiving space of the pill carrier and then to empty them all at once into the compartments of the pre-dosing magazine in a single step. If, in the repackaging according to the method of EP 2 993 133 A1 in a new blister to be created, several medications are provided in each blister pocket and it is the case in a specific individual case that there are no blister carriers for the individual medications, the pill carrier according to the invention can be used for pre-packing in a way that makes perfect sense, in which the various pills are already inserted into the receiving space when the pill carrier is being filled, whereby it is also possible to fill the pill carrier with several mixed pills or several single-ingredient pills. For such applications, it may be useful to make the receiving space larger so that it can hold more than one but still only a small number of pills. In a preferred embodiment, the volume of the receiving space is greater than 500 $mm^3$, particularly preferred greater than 1000 $mm^3$, particularly greater than 1200 $mm^3$, particularly preferred greater than 1500 $mm^3$. In a preferred embodiment, the volume of the receiving space is less than 27000 $mm^3$, more preferably less than 20000 $mm^3$, more preferably less than 15000 $mm^3$, more preferably less than 10000 $mm^3$, more preferably less than 8000 $mm^3$, more preferably less than 5000 $mm^3$.

In a preferred embodiment, the receiving space exhibits an opening on one side. In a preferred embodiment, the receiving space exhibits only one opening. In this preferred embodiment, the receiving space is therefore only loaded with the pill to be received by the receiving space via the one opening, with the same opening being used to remove the pill from the receiving space again. The opening of the receiving space allows the pill to be inserted into the receiving space. In particular, the cross-sectional area of the opening is large enough to allow the insertion of a pill. In a preferred embodiment, the opening is square, rectangular, polygonal, triangular, elliptical or circular. In a preferred embodiment, the opening exhibits a cross-sectional area of more than 5 $mm^2$, more particularly more than 25 $mm^2$, more particularly more than 100 $mm^2$. In a preferred embodiment, the opening exhibits a cross-sectional area of less than 800 $mm^2$, in particular less than 600 $mm^2$, in particular less than 400 $mm^2$, in particular less than 300 $mm^2$, in particular less than 200 $mm^2$.

In the pill carrier according to the invention, the receiving body is arranged in the recess such that it can be pivoted about a pivot axis. In this context, the term 'pivot axis' is initially understood to mean only the line (the axis) around which the receiving body pivots. In a preferred embodiment, it is conceivable, but not absolutely necessary for the realization of the pill carrier, that the receiving body is penetrated by an axis, for example a metal axis, whose longitudinal axis is then the pivot axis. The pivotable mounting of the receiving body about the pivot axis can also be achieved, for example, by the receiving body providing two lateral projections which project on opposite sides of the receiving body and lie on the pivot axis, these projections engaging in recesses in the limiting walls and thereby providing the pivotable mounting of the receiving body about the pivot axis. It is also possible to reverse the kinematics of this solution, namely by equipping the limiting walls with projections that engage in recesses in the receiving body.

In a preferred embodiment, there is only a slight gap, for example a gap of less than 4 mm, more particularly less than 3 mm, more particularly less than 2 mm, more particularly about 1 mm or less than 1 mm, between the surfaces of the receiving body and the limiting walls directly opposite them. The gap between the surfaces of the receiving body and the limiting walls of the recess opposite them is preferably chosen so that it allows sufficient play for easy pivoting of the receiving body in the recess, but is small enough that even small pills, or even half pills, cannot be jammed in the gap. In a preferred embodiment, no gap is provided between the surfaces of the receiving body and the limiting walls opposite them. Avoiding a gap prevents dust from entering the receiving space during the transport of the pill carrier and contaminating the pill in it.

In the pill carrier according to the invention, it is envisaged that the receiving body exhibits a closed position and an open position. In the closed position, the opening of the receiving space is arranged opposite a limiting wall and is closed by it. In the open position, the opening of the receiving space is at least partially aligned with the bottom opening, and is particularly preferably fully aligned with it.

In a preferred embodiment, the closed position is one of the end positions of the possible pivoting movements of the receiving body. In a preferred embodiment, a part of the receiving body comes into contact with a part of the base body when the receiving body reaches the closed position. This contact can prevent the receiving body from being swung beyond the closed position. In such an embodiment, the receiving body can only be swung out of the closed position in one direction.

In a preferred embodiment, the open position is one of the end positions of the possible pivoting movements of the receiving body. In a preferred embodiment, a part of the receiving body comes into contact with a part of the base body when the receiving body reaches the open position. This contact can prevent the receiving body from being swung beyond the open position. In such an embodiment, the receiving body can only be swung out of the open position in one direction.

In a preferred embodiment, the opening of the receiving space in the open position is spaced apart from the bottom opening, wherein the recess between the opening and the bottom opening is in the form of a shaft that guides pills entering through the bottom opening towards the opening of the receiving space in the open position and guides pills exiting from the opening of the receiving space in the open position towards the bottom opening.

In a preferred embodiment, the receiving body pivots from the closed position to the open position about the pivot axis by less than 135 degrees, more preferably by less than 110 degrees, more preferably by less than 90 degrees, more preferably by less than 75 degrees. In a preferred embodiment, the receiving body pivots from the closed position to the open position about the pivot axis by more than 5 degrees, more preferably by more than 15 degrees, more preferably by more than 25 degrees, more preferably by more than 30 degrees.

In a preferred embodiment, the receiving body is made of plastic, in particular an injection-moulded part or a part produced by means of additive manufacturing, for example by means of 3D printing. In another embodiment, the receiving body is made of stainless steel. The pill carrier can be made of plastic. Parts of the pill carrier, in particular the boundary of the receiving space or any closures, can be made of stainless steel.

In a preferred embodiment, the receiving body is wedge-shaped and exhibits a tip through which the pivot axis passes. Furthermore, in this preferred embodiment, the receiving body has a basis opposite the tip, in which the opening of the receiving space is arranged. In this embodiment, the receiving space is arranged in the wedge-shaped receiving body between the basis and the tip. In an alternative embodiment, the receiving body is horseshoe-shaped or U-shaped in cross-section, which may also be referred to as trough-shaped. In this preferred embodiment, the pivot axis passes through the material of the receiving body at the base of the U or at the base of the horseshoe, while the opening of the receiving space is formed between the two ends of the U or the two ends of the horseshoe and the receiving space is formed by the free space in the U or the horseshoe.

In a preferred embodiment, the cross-sectional shape and/or cross-sectional size of the receiving body does not change in the direction of the pivot axis or at most in end regions. In a preferred embodiment, the majority, in particular the vast majority, in particular all cross-sections of the receiving body perpendicular to the pivot axis exhibit the same cross-sectional area and/or the same cross-sectional shape.

In a preferred embodiment, the receiving space of the receiving body is bounded by side walls. In a preferred embodiment, the receiving space is wedge-shaped or trough-shaped in cross-section. In a preferred embodiment, the receiving space is bounded by two side walls that extend at an angle to each other and lead to a base of the receiving space or meet at an acute angle (which would then form the base of the receiving space). In a preferred embodiment, the receiving space is designed to be trough-shaped. In such an embodiment, the receiving space is limited by two opposing side walls, while the receiving space is open at two opposing ends and is closed there by the presence of the limiting walls of the recess. In the case of a trough-shaped receiving space that is open at its ends and is limited there by limiting walls, the preferred embodiment provides that the end openings of the trough-shaped receiving space are closed by limiting walls in every pivoted position of the receiving body between the closed position and the open position. This prevents the pills from escaping from the end openings of a trough-shaped receiving space and ensures that the pills can only escape through the openings of the receiving space. In an alternative embodiment, the receiving space has no end openings, but is limited on all sides by side walls and exhibits only the opening.

In a preferred embodiment, a limiting wall of the recess has a surface section that exhibits the shape of a section of the circumferential surface of a cylinder. In such an embodiment, it is provided that a side wall of the receiving body is provided, which ends in an edge of the receiving body, wherein the edge is moved along the surface section when the receiving body pivots about the pivot axis.

In a preferred embodiment, the surface section, which exhibits the shape of a section of the circumferential surface of a cylinder, merges into a surface section of the recesses, which forms part of a shaft. In a preferred embodiment, the surface section designed in the form of a section of the circumferential surface of a cylinder is bent around an axis running parallel to the pivot axis or, in particular, around the pivot axis. The axis running parallel to the pivot axis or the pivot axis itself thus forms the longitudinal axis of the cylinder, while the surface section forms the shape of a section of the circumferential surface of this cylinder.

In a preferred embodiment, a spring element is provided which, when a receiving body is pivoted out of the closed position, exerts a restoring force on the receiving body in the direction of the closed position. This spring element can make it possible for the closed position to be the preferred position of the receiving body. The spring element can be a spring, for example a spiral spring. However, embodiments in which the spring element is designed in the manner of a hydraulic damper are also conceivable.

In a preferred embodiment, the base body exhibits a bottom surface in which the bottom openings of the recesses are provided. Furthermore, the base body particularly preferably exhibits an upper surface opposite the bottom surface, in which upper surface upper openings of the recesses are provided, so that the respective recess extends from its respective upper opening through the base body to the bottom opening. In a preferred embodiment, the upper opening and the bottom opening are at least partially aligned. In a preferred embodiment, the upper opening is larger than the bottom opening. In a preferred embodiment, the upper opening is closed by a side wall of the receiving body in the closed position of the receiving body. In a preferred embodiment, when the receiving body is in the closed position, a side wall of the receiving body is in the plane of the upper surface or in a plane offset from the upper surface. In a preferred embodiment, when this side surface is not in the plane of the upper surface, it is offset from the plane of the upper surface by less than 5 mm, more preferably by less than 3 mm, and more preferably by less than 1 mm, in a plane parallel to the plane of the upper surface.

In a preferred embodiment, the base body of the pill carrier according to the invention is cuboid. In a preferred embodiment, the bottom surface is rectangular. In a preferred embodiment, the upper surface is rectangular. In a particularly preferred embodiment, the bottom surface and the upper surface have the same cross-sectional shape and/or the same cross-sectional size. In a preferred embodiment, the bottom surface and/or the upper surface are larger than the side surfaces of the base body connecting the upper surface and the bottom surface by at least 1.5 times, in particular by at least 2 times.

In a preferred embodiment, the recesses of the pill carrier, in which a receiving body is provided, are arranged in a row or in the manner of a matrix. In this case, embodiments are also conceivable in which the recesses are arranged in several rows adjacent to one another, wherein recesses in respectively adjacent rows can be arranged offset to one another. Such offset arrangements can simplify the provision of structural elements for pivoting the receiving body and at the same time enable the rows of recesses to be arranged as close as possible next to each other. It is also possible to have embodiments in which the individual recesses are deliberately spaced apart from each other in order to prevent a pill that is to be inserted into the bottom opening not falling into the bottom opening of an adjacent recess.

In a preferred embodiment, the distance between the bottom opening of a first recess and the bottom opening of a second recess adjacent to the first recess is greater than 3 mm, more particularly greater than 5 mm, more particularly greater than 10 mm, the distance being the measure between the point on the edge of the bottom opening of the first recess that is closest to the edge of the bottom opening of the adjacent recess and the point on the edge of the bottom opening of the second recess that is closest to the edge of the bottom opening of the first recess.

In a preferred embodiment, a status signal light is provided in the base body besides a recess. A light source, for example a bulb, but in particular an LED, is understood to be a status signal light. The status signal light can be arranged next to the recess over the wall of the base body that limits the bottom opening of the recess, for example, so that it protrudes over the bottom surface. In a preferred embodiment, however, the status signal light is designed inside the base body or flush with a surface of the base body. The status signal light can be used, for example, to indicate the pivoted position of the receiving body. In a preferred embodiment, an electrical contact is provided on the receiving body, which comes into contact with a contact on a limiting wall of the recess in a certain pivoted position. This coming into contact can be used to make the status signal light light up. In a preferred embodiment, the status signal light is illuminated when the receiving body is in the open position. Such a status signal light can be used to indicate to the person filling the pill carrier which receiving body is in the open position. There are also possible embodiments in which the color of the status signal light changes or in which two status signal lights of different colors are provided next to a recess. In such an embodiment, the status signal light can light up in a first color (or the status signal light that exhibits the first color can light up) when the receiving body is in a first pivoted position, for example in the open position and the status signal light lights up in a second color (or the status signal light with the second color lights up) when the receiving body is in a second pivoted position, for example the closed position.

Another possible embodiment is where the receiving bodies are transparent so that light can shine through them and/or so that they can be seen into. This can be used to indicate the chambers to be filled. In addition, after the receiving bodies have been filled, they can be illuminated from below and the contents, which are displayed as a shadow, can be analyzed and checked for completeness or absence using image processing.

In a preferred embodiment, a status signal light is provided next to each recess in the base body in which a receiving body is provided.

In a preferred embodiment, the base body exhibits a machine-readable printed code on one of its surfaces. In addition or as an alternative, an RFID tag can be provided in the base body of the pill carrier, by means of which the pill carrier can be identified.

In an alternative embodiment, no receiving body is provided in the respective recess, but the bottom openings are closed with a layer of sealing material, wherein a slit is provided in the layer in the area of the bottom opening, through which a pill could be pressed onto the tablet under pressure, and an upper surface opposite the bottom surface is provided, in which upper openings of the recesses are provided, so that the respective recess extends from its respective upper opening through the base body to the bottom opening and the respective upper opening is closed by a layer of sealing material, wherein the sealing material is flexible in such a way that it can be pressed into the recess under pressure by a plunger and can push a pill located there through the slit. In a preferred embodiment, the slit is closed against the ingress of dust before the pill passes through; this can be achieved by an overlapping design of the edges defining the slit. Can be produced in a matrix-like arrangement by overlapping strips, which are then, for example, welded between the recesses to increase the sealing force.

The invention also relates to a filling device for a pill carrier according to the invention. The filling device exhibits a receptacle for the pill carrier and a plunger. The plunger can be moved in a pushing direction towards the receptacle by means of a movement. In addition or as an alternative, the receptacle can be moved towards the plunger by means of a movement against the pushing direction. In a system comprising such a filling device and a pill carrier according to the invention, the plunger can be brought into contact with the receiving body by the movement in the pushing direction and can pivot the receiving body out of the closed position into the open position, or the receptacle is moved towards the plunger against the pushing direction in such a way that the plunger comes into contact with the receiving body and pivots the receiving body out of the closed position into the open position.

In a preferred embodiment, the plunger is fixed in the filling device, while the receptacle is arranged in the filling device so that it can be moved by means of drives. It is envisaged that the receptacle can be moved towards the plunger by a movement against the pushing direction. In addition, it may be envisaged that the receptacle, which may be designed as a receiving frame, for example, can be moved relative to the plunger in one or more directions that are at an angle, preferably at an angle of 90 degrees, to the pushing direction.

In an alternative embodiment, the receptacle, which can be designed as a receptacle frame for the pill carrier, is arranged in a fixed position in the filling device, while the plunger can be moved by drives in a pushing direction towards the receptacle. In a preferred embodiment, it is additionally provided that a plunger carrier, in which the plunger is mounted, can be moved relative to the receptacle in one or, in particular, in several directions, which are at an angle, in particular, at an angle of 90 degrees, to the pushing direction.

Both embodiments can also be combined to the extent that both the receptacle and the plunger are each arranged in the filling device so as to be movable by drives.

Embodiments are possible in which the filling device exhibits a single plunger. In such embodiments, in addition to the relative movement of the plunger with respect to the receptacle in the pushing direction, it must also be possible to provide relative movements between the plunger and the receptacle in at least one further direction at an angle to the pushing direction, preferably at an angle of 90 degrees to the pushing direction, so that the plunger can be brought into contact with not just one but several receiving bodies, preferably with all receiving bodies of the pill carrier, by means of corresponding relative movements.

However, embodiments are also conceivable in which the filling device has several plungers. The plungers can be arranged in rows. If, for example, pill carriers that exhibit recesses, in which several recesses are arranged in a row and several rows are arranged next to one another, are filled with the filling device, then such pill carriers can be filled with filling devices that have a row of plungers. In such an embodiment, the rows of recesses in the pill carrier are then filled one after the other and, after one row has been filled, the receptacle and the plunger are moved relative to one another in at least one direction perpendicular to the pushing direction. However, embodiments are also conceivable in which the number of plungers corresponds to the number of recesses with receiving bodies in the pill carrier. In such an embodiment, the receptacle and the plunger would be moved relative to one another only in the pushing direction and all of the receiving bodies would be pivoted by the plunger from the closed position into the open position in a single operation.

The decision on how the filling device is designed and whether a plunger or a row of plungers is provided also depends on the way in which the pill carrier is to be filled in the filling device. There are conceivable usage scenarios in which each receiving space of the pill carrier is to be filled with the same pill. In such usage scenarios, it may make sense to swing all receiving bodies simultaneously into the open position in order to then fill the respective receiving spaces of the receiving bodies with pills of the same type in one or a few operations. However, there are also possible usage scenarios in which the receiving spaces of the receiving bodies have to be filled according to a certain pattern, but not in such a way that the same pill is arranged in all receiving spaces. In such usage scenarios, it may also prove expedient from a safety point of view to use the plunger to swing only a single receiving body into the open position to fill its receiving space. If all other receiving bodies remain in the closed position during this filling step, it can be prevented that a pill unintentionally enters another receiving space. Even if this leads to more relative movements between the receptacle and the plunger, or the plungers, it may be useful in some usage scenarios, and especially where there are high safety requirements, to equip the filling device with only a single plunger, even if it is used to swing several receiving bodies into the open position one after the other and a relatively large number of relative movements between the plunger and the receptacle are necessary to do so.

The selective opening of receiving spaces can also be brought about in embodiments of the filling device that exhibit several plungers, but which can be moved independently of one another. For example, the plungers can be moved by their own hydraulic cylinders. In such embodiments, it is possible, by activating the respective hydraulic cylinder, to move only a single plunger in the pushing direction, while the other plungers are not moved in the pushing direction. The term ‘hydraulic cylinder’ refers to any form of an extending plunger, including magnetic or electric cylinders.

In a preferred embodiment, a circulating belt is provided, in particular a belt circulating between two rollers running parallel to each other, wherein at least one nub is provided on the belt, which can be moved by the belt into a position relative to the plunger, in which the nub lifts the plunger. Such a design can be used, for example, to lift a row of plungers arranged in line with one another one after the other. If the plungers are biased by a spring element into the retracted position, this can enable the plunger to retract against the pushing direction when the nub is no longer in contact with the plunger.

In an embodiment in which several plungers are provided that are to be moved simultaneously, it may be possible to arrange the plungers on a frame or on a board and to move the frame or the plate, for example, by lifting the board, for example, by means of a lever, for example, by means of a cam, and thereby move all the pills at the same time.

In a preferred embodiment, in which a status signal light is provided in the base body in addition to a recess, it is possible that there is a contact on the plunger that comes into contact with a contact on the base body, wherein the status signal light lights up after this contact is made, or lights up in a certain color, and in particular its color changes from a first color to another color. In such an embodiment, it is not the relative position of the receiving body in the recess that is used to control the status signal light, but a relative position of the plunger relative to a recess.

In a preferred embodiment, a receiving frame designed as a biaxial slide for the pill carrier is moved back and forth in such a way that the respective receiving body to be pivoted is guided over a stationary plunger, above which there is an insertion point. The stationary plunger pivots the receiving body from the closed position to the open position.

In an alternative embodiment, a plunger carrier designed as a biaxial slide is moved under a receiving body of a pill carrier, wherein, for example, receiving bodies arranged next to one another can also be approached in sequence and can each be pivoted from the closed position into the open position.

In a preferred embodiment, the filling device exhibits a device for generating a light grid. In a preferred embodiment, this device generates the light grid in a plane above the bottom opening or in a plane below the bottom openings. The light grid can be used to determine whether a pill is falling out of a specific bottom opening (if the bottom opening is facing downwards and the light grid is located below the bottom opening) or whether a pill is falling into a specific bottom opening from above (if the bottom opening is facing upwards and the light grid is located above the bottom opening). A light grid of this kind can also be used to check whether the pill carrier is being filled correctly.

Instead of a light grid, capacitive sensors can also be used to detect when a pill has fallen through.

The invention also relates to a method for filling a pill carrier using a filling device. The method according to the invention provides that, when a pill carrier is located in the receptacle, the plunger and the receptacle are moved relative to each other so that the plunger is brought into contact with the receiving body and, by further moving the plunger, the receiving body pivots from the closed position into the open position, whereby the opening of the receiving body is at least partially aligned with the bottom opening of the pill carrier. With the method according to the invention, when the opening of the receiving body is at least partially aligned with the bottom opening, it is possible to insert a pill into the receiving space through the bottom opening and through the opening of the receiving body, for example by dropping it from above under the force of gravity.

In a preferred embodiment, the receptacle and the plunger are then moved relative to each other again so that the plunger is guided out of the base body and allows the receiving body to swing back from the open position to the closed position.

In a preferred embodiment, the receiving space is illuminated after filling. On the one hand, the illumination makes it possible to determine whether the receiving space is occupied at all. This alone can detect errors in filling, namely if the specific receiving space was forgotten during filling.

The transillumination can be supplemented by taking a picture of the image that the transilluminated receiving space casts on a surface (outline image or silhouette). By evaluating the image, it is possible to recognize a characteristic shape of the pill for a large number of pills and thus determine whether the pill in the receiving space is the correct one (or at least has a shape that matches the shape of the desired pill).

In a preferred embodiment, the filling device can be designed so that several pill carriers can be filled at the same time; for example, two pill carriers arranged directly next to each other.

In a preferred embodiment, the opening of a receiving space is communicated to a software (for example, a software of the filling device, but possibly also a software of a higher-level system) during filling, so that the software can monitor the process; for example,

- when the box of medication is scanned,
- when the pills are stored,
- when the receiving space is closed,
- when a package that has been started is returned or an empty package is disposed of.

When the empty pack is disposed of, it can be scanned again. This helps to prevent a situation where a first pack is taken, scanned, and then a second pack is taken and pills from the second pack are mistakenly dispensed instead of the pills from the first pack. When the pack is thrown away, it is recognized that it is not the first pack that was scanned that is being thrown away, but a different one.

If there are any pills left over, the software can be designed to know this in advance and, after the targeted and planned filling with the desired number of pills, then return the remaining pills in partially used blisters to storage. If it is determined that the filling was carried out according to the prediction, an operator can acknowledge this and a small printer can, for example, print a label with all the information (expiration, batch, PZN, remaining pills, etc.) as a data matrix code. In a preferred embodiment, the partially used package with the new label is scanned after use and returned to the warehouse. There, the new label can be used to distinguish the partially used package from a new one, even in an automated operation.

In a preferred embodiment, the pill carrier according to the invention can be inserted into a filling blister in a method for the repackaging of a variety of different medications from their respective original blisters, which method exhibits the following procedural steps:

- Assignment of the original blisters filled with medication to a blister carrier with standardized external dimensions intended for the respective original blister type.
- Packaging of the original blisters filled with medication in the assigned blister carrier
- Intermediate storage of the original blisters packed in the blister carriers in an intermediate storage area.
- Removal of the original blister of a selected one of the plurality of medications packed in the blister carrier from the intermediate storage location upon request, and
- Ejection of a defined number of units of the selected medication from the original blister into the filling blister.

In addition to the ejection of a defined number of units of the selected drug from the original blister into the filling blister, a defined number of selected drugs are ejected from the receiving spaces of the pill carrier according to the invention into the filling blister in a further process step.

In a preferred embodiment, the pill carrier according to the invention can be used to carry out the method according to EP 2 993 133 A1, whereby reference is made to EP 2 993 133 A1 for the detailed description of the method to be carried out. When a blister carrier is mentioned there, a pill carrier according to the invention is used when carrying out the method described there.

The invention can be used, for example, in the blister packaging of individual pills in weekly blisters.

BRIEF DESCRIPTION OF THE DRAWINGS

The invention is explained in more detail below, with reference to only one example of the invention shown in the accompanying figures. These show.

DETAILED DESCRIPTION

Figure 1:
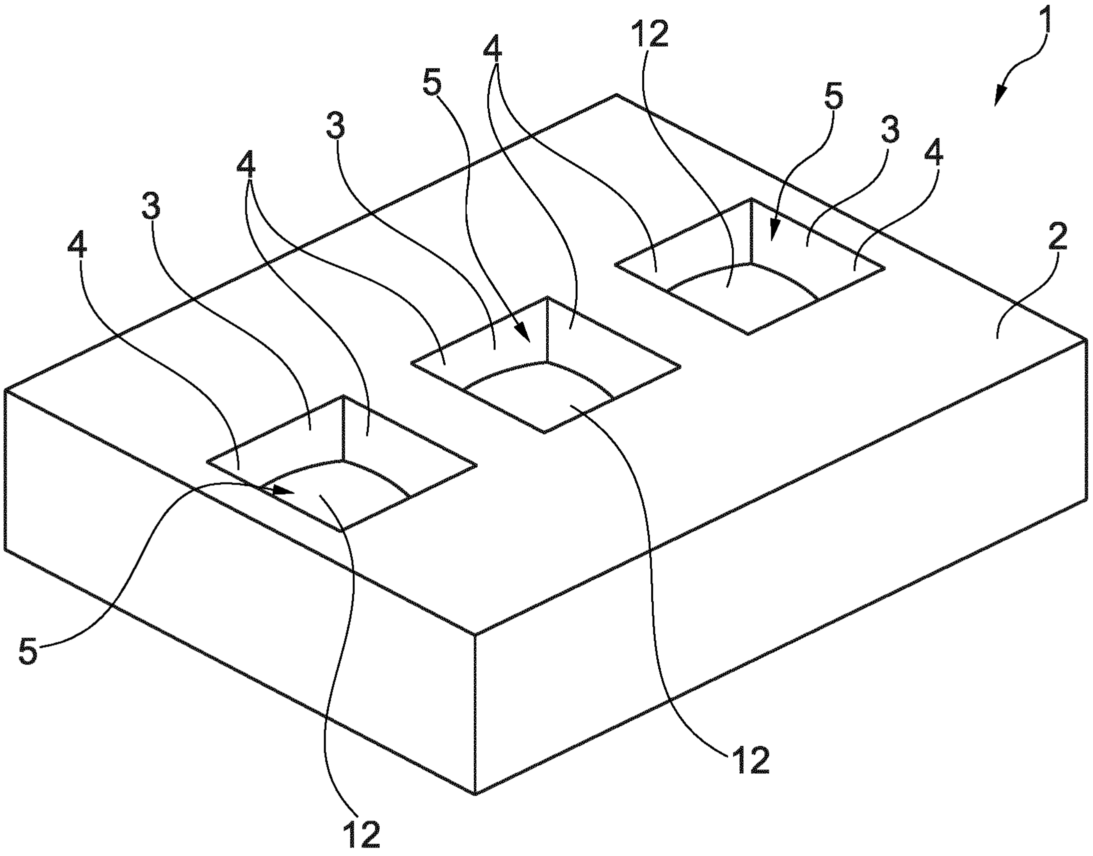
FIG. 1 a schematic, perspective view from above on the bottom surface of a pill carrier according to the invention.
Figure 2:
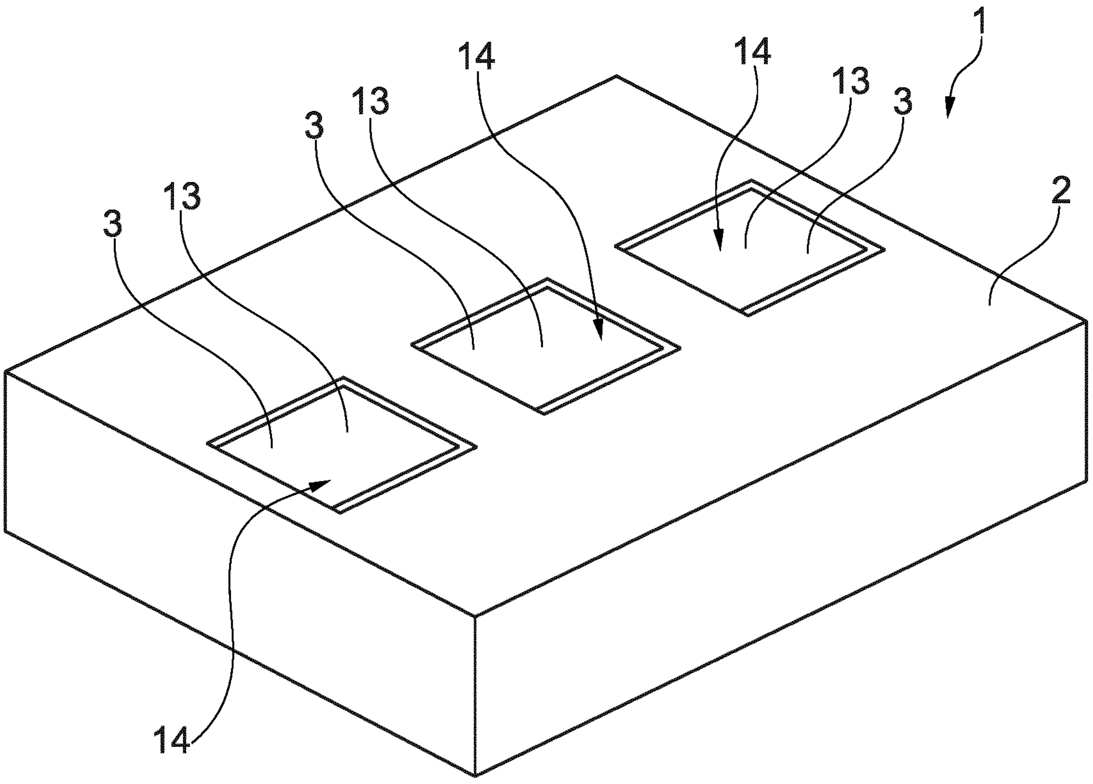
FIG. 2 a schematic, perspective view from above on the upper surface of a pill carrier according to the invention.

The pill carrier 1 according to the invention is suitable for the intermediate transport of pills in a blister packaging process. The pill carrier 1 exhibits a base body 2 and a plurality (in FIGS. 1 to 3: three) of recesses 3. Each recess 3 is limited by boundary surfaces 4 and exhibits a bottom opening 5 in each case.

A receiving body 6 is provided in each recess 3. The respective receiving body 6 exhibits a receiving space 7. The receiving space 7 is suitable for receiving a pill 8. The receiving space 7 exhibits an opening 9 on one side, which allows the pill to be inserted into the receiving space 7. The receiving body 6 is arranged in the recess 3 so as to be pivotable about a pivot axis A, wherein the receiving body 6 can be pivoted from a closed position, shown in FIG. 3, in which the opening is arranged opposite a limiting wall 4 and is closed by the limiting wall 4, can be pivoted into an open position (shown in FIG. 4), in which the opening 9 is at least partially aligned with the bottom opening 5.

The receiving body 6 is wedge-shaped and exhibits a tip 10, through which the pivot axis A passes. A basis 11, which is located opposite the tip 10 and can also be referred to as a closing leg, is provided, in which the opening 9 of the receiving space 7 is arranged.

The receiving body 6 exhibits an initial side wall 12. In the closed position shown in FIG. 3, this faces the bottom opening. Furthermore, the wedge-shaped receiving body 6 exhibits a second side wall 13, which can also be designated as a pressure-side surface, which, in the closed position shown in FIG. 3, faces an upper opening 14 of the recess 6 and closes it (see FIG. 2).

Figure 3:
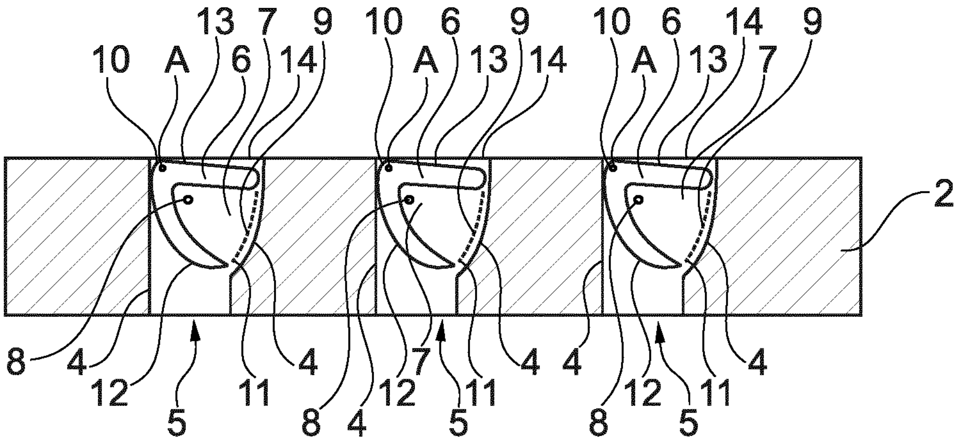
FIG. 3 a sectional view through three recesses of a pill carrier according to the invention in a first operating situation.
Figure 4:
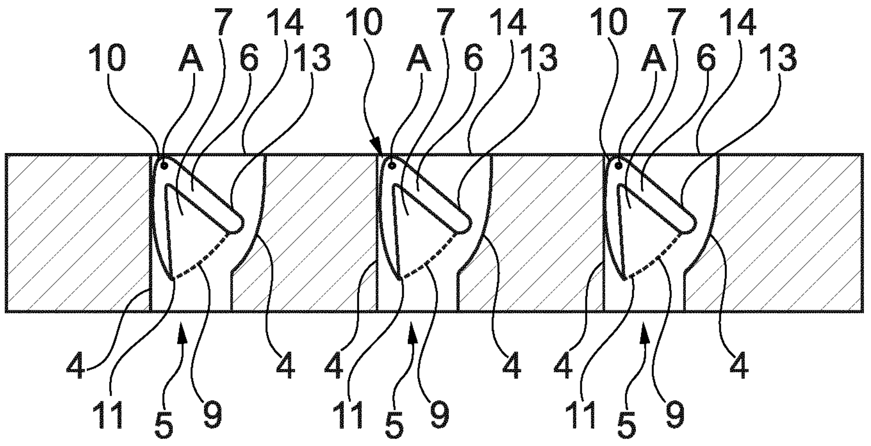
FIG. 4 a sectional view through three recesses of a pill carrier according to the invention in a second operating situation.

If the receiving body 6 is moved from the closed position shown in FIG. 3 to the open position shown in FIG. 4, the pill 8, which was still held in the receiving space 7 when the receiving body 6 was in the closed position, can fall out of the pill carrier 1 through the opening 9 and the bottom opening 5.

To fill the pill carrier 1 according to the invention, it can be held at 180 degrees to the position shown in FIGS. 3 and 4, i.e. with the bottom opening 5 facing upwards and the upper opening 14 facing downwards. When the pill carrier 1 is in this position and the receiving body 6 is swung from the closed position to the open position, a pill 8 can be thrown from above through the bottom opening 5 and the opening 9 into the receiving space 7. If the receiving body 6 is moved from this open position into the closed position, the opening 9 is closed by the opposing limiting wall 4 (comparable to the position of the opening 9 to the limiting wall 4 in FIG. 2). If the pill carrier according to the invention is then turned back from the layer rotated 180 degrees for filling into the layer shown in FIG. 3, the pill 8 remains in the receiving space 7 due to the closure of the opening 9 by the limiting wall 4 opposite the opening 9.

A receiving body 6 is held in the closed position shown in FIG. 3 by a spring element that is not shown in more detail. This prevents the receiving body 6 from pivoting downwards and opening the opening 9, even when the base body 2 is aligned as shown in FIG. 3. The pills 8 are held securely in the receiving space 7 by the spring element and the resulting preload of the receiving body 6 in the closed position, even in this position of the base body 2. Only when the receiving body 6 is moved from the closed position (FIG. 3) to the open position (FIG. 4) by interaction with a plunger acting on the second side face 13, does the pill 8 drop through the opening 9 and the bottom opening 5 downwards out of the pill carrier 1.

Figure 5:
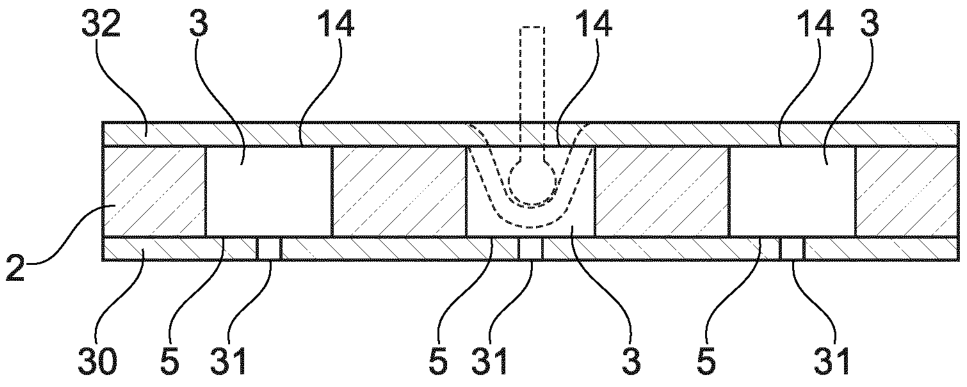
FIG. 5 a sectional view through a pill carrier according to the invention in a second embodiment, FIG. 6 a schematic view of a filling station according to the invention in a first embodiment, FIG. 7 a schematic view of a filling station according to the invention in a second embodiment with pill carriers inserted into the filling station, FIG. 8 a schematic view of the filling station according to the invention according to FIG. 7 with a pill carrier arranged next to the filling station, FIG. 9 a schematic view of a filling station according to the invention in a third embodiment FIG. 10 a schematic view of a filling station according to the invention in a first embodiment, FIG. 11 a representation of an illuminated receiving space of a pill carrier according to the invention with the outlines of a pill located in the receiving space and FIG. 12 a schematic view of a possible image detail for a receptacle.

In the embodiment shown in FIG. 5, no receiving body is provided in the respective recess 3, but the bottom openings 5 are closed with a layer 30 of sealing material, wherein a slit 31 is provided in the layer 30 in the area of the bottom opening 5, through which a pill could be pressed under the effect of pressure, and an upper surface opposite the bottom surface is protruded, in which upper openings 14 of the recesses 3 are provided, so that the respective recess 3 extends from its respective upper opening 14 through the base body 2 to the bottom opening 5 and the respective upper opening 14 is closed with a layer 32 of sealing material, wherein the sealing material is flexible in such a way that it can be pressed into the recess by a plunger under pressure and can push a pill located there through the slit. In FIG. 5, the pressed-in layer 32 is shown as a dashed line.

Figure 6:
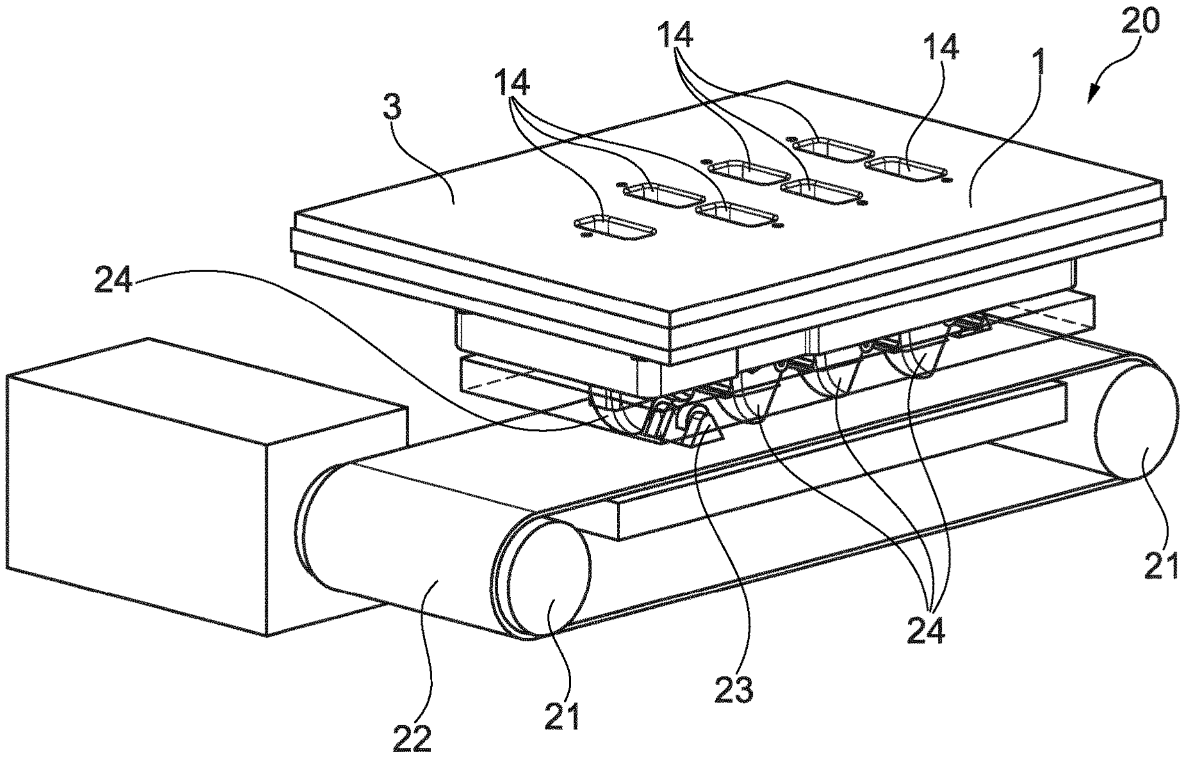

FIG. 6 shows a filling device 20 in a first embodiment. A pill carrier 1 according to the invention is arranged on a table of the filling device 20. Plungers 24 are arranged movably in the table. A belt 22 is provided, which circulates between two parallel rollers 21, with at least one nub 23 being provided on the belt 22, which can be moved by the belt 22 into a position relative to the plungers 24, in which the nub 23 lifts the respective plunger 24.

Figure 7:
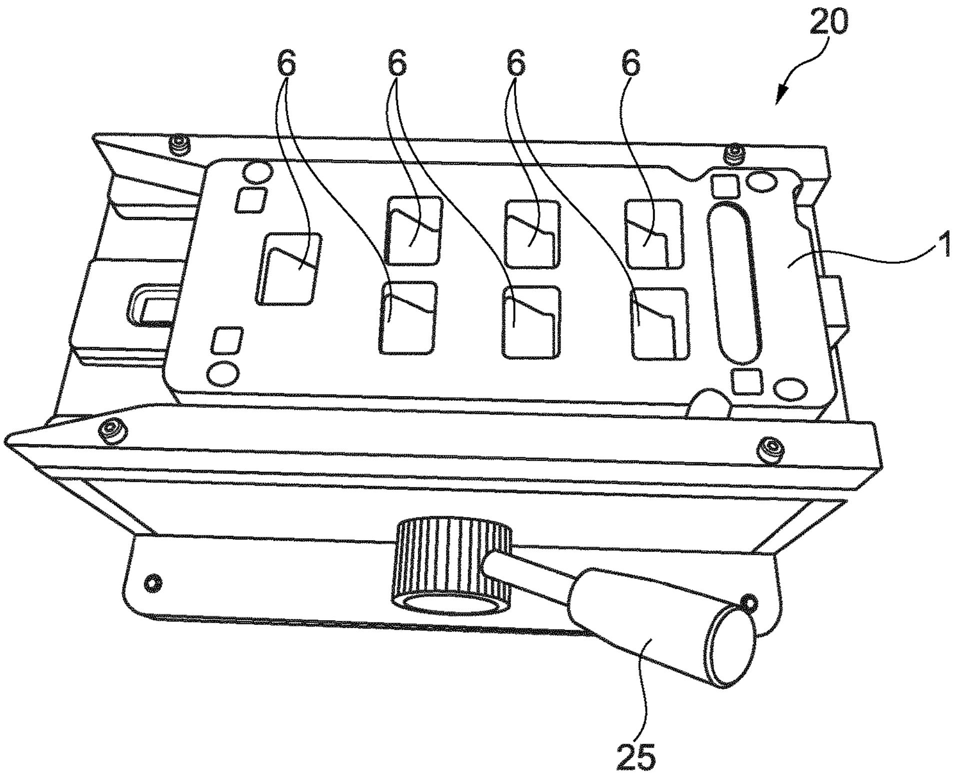
Figure 8:
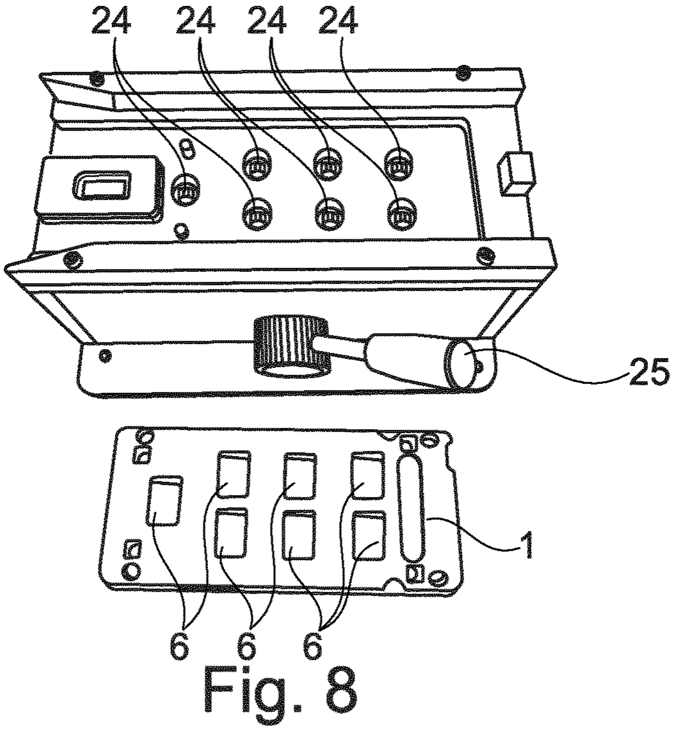

FIGS. 7 and 8 show a filling device 20 in a second embodiment. Here, the filling device exhibits several plungers 24 that can be moved simultaneously. The plungers are arranged on a board and can be lifted by moving the board, namely by means of a lever 25, for example by means of a cam connected to the lever.

Figure 9:
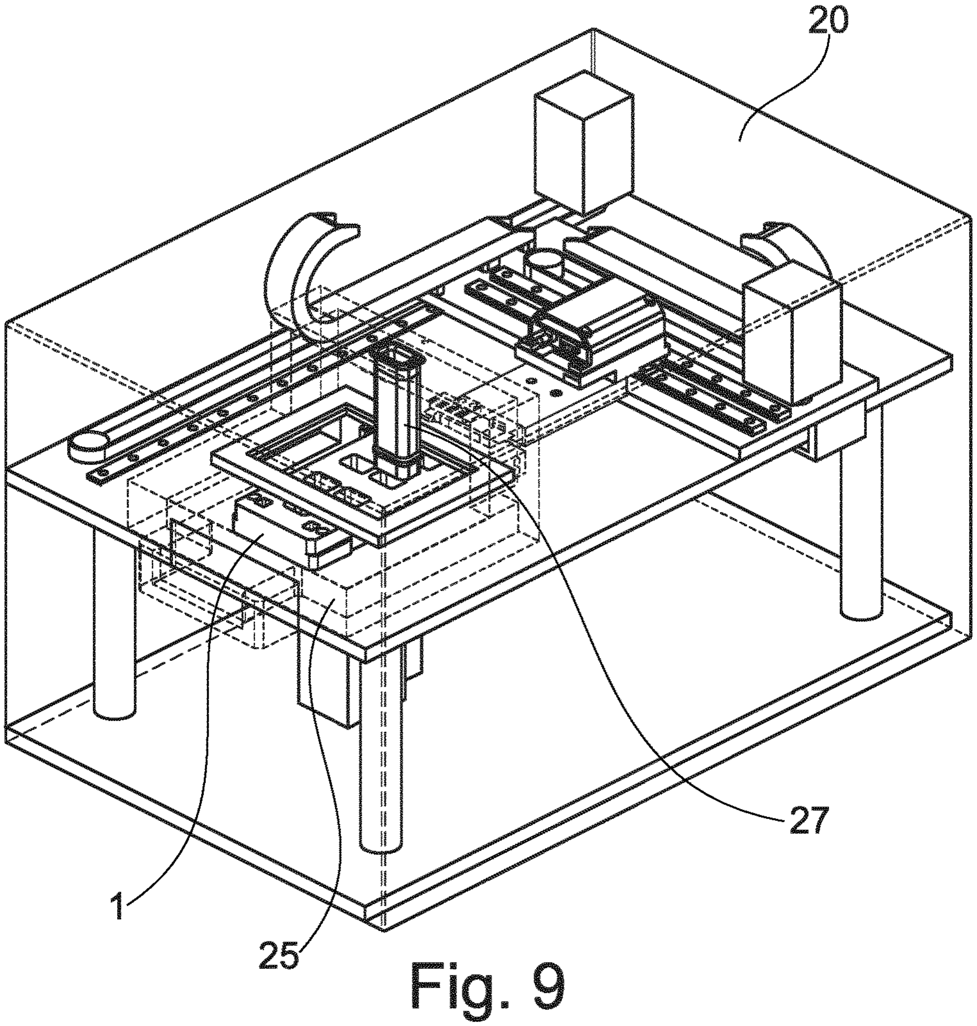

FIG. 9 shows a filling device 20 in a third embodiment. The pill carrier 1 is arranged on a receiving frame 26 designed as a biaxial slide. The receiving frame 26 is moved back and forth in such a way that the respective receiving body 6 to be pivoted is guided over a stationary plunger, above which there is a throw-in. The stationary plunger pivots the receiving body from the closed position to the open position.

Figure 10:
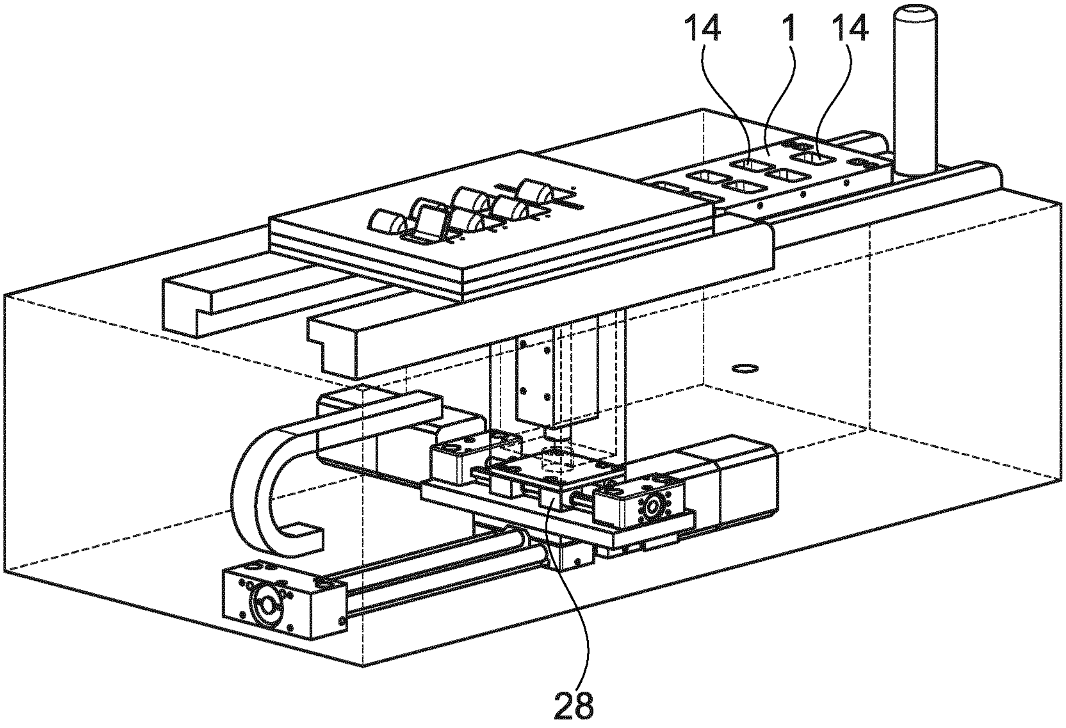

FIG. 10 shows a filling device 20 in a fourth embodiment. Here, a plunger carrier 28 designed as a biaxial slide is moved under a receiving body 6 of a pill carrier 1, wherein, for example, receiving bodies arranged next to one another can also be approached in sequence and can each be pivoted from the closed position into the open position.

Figure 11:
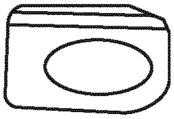

FIG. 11 shows a schematic view of an image that would be obtained by shining a light through a receiving space with a pill. It can be seen that a characteristic shape of the pill can be made out in this way.

Figure 12:
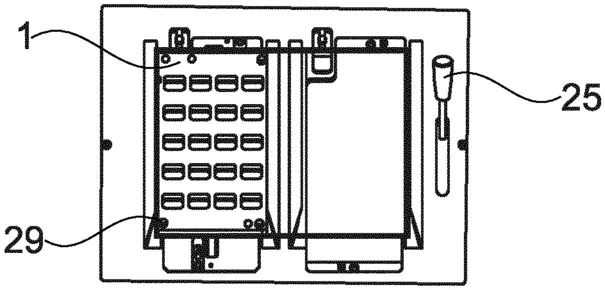

FIG. 12 shows, as frame 29, the image detail of a camera in use in a filling device of the type shown in FIGS. 7 and 8, as with lever 25, whereby the filling device 20 of FIG. 12 has been modified so that it exhibits two places where it can receive pill carriers according to the invention. In the illustration of FIG. 12, the left-hand place is occupied.

The invention claimed is:

1. A pill carrier for the intermediate transport of pills in a blister packaging process, wherein the pill carrier comprises:

a base body; and a plurality of recesses, wherein the recesses are defined by limiting walls and comprise a bottom opening;

wherein a receiving body is provided in each respective recess between the limiting walls;

wherein the receiving body comprises a receiving space for receiving one or a small number of pills, wherein the receiving space is arranged in the receiving body and comprises an opening on one side which allows said one or small number of pills to be inserted into the receiving space, and the receiving body is arranged in the recess such that the receiving body can be pivoted about a pivot axis (A), wherein the receiving body can be pivoted from a closed position, in which the opening is arranged opposite one of the limiting walls and is thereby closed, into an open position, in which the opening is at least partially aligned with the bottom opening or no receiving body is provided in the recesses, and the base opening is closed with a layer of closure material, wherein a slit is provided in the layer in the region of the base opening, through which a pill could be pushed under pressure onto the pill, and an upper surface of the base body opposite a bottom surface of the base body is provided, wherein upper openings of the recesses are provided in the upper surface, so that each recess extends from the upper opening of the recess through the base body to the bottom opening and the upper opening of the recess is closed by a layer of sealing material, the sealing material being flexible such that it can be pressed into the recess by a plunger under pressure and can push a pill located there through the slit.

2. The pill carrier of claim 1, wherein the receiving body is shaped in a wedge-shaped manner and comprises a tip through which the pivot axis (A) passes, and a base lying opposite the tip, wherein the opening of the receiving space is arranged in the base, and the receiving space is arranged in the wedge-shaped receiving body between the base and the tip;

or is shaped in a trough-shaped manner and comprises a trough floor, through which the pivot axis (A) leads, and a base lying opposite the trough floor, in which the opening of the receiving space is arranged, and the receiving space is arranged in the trough-shaped receiving body between the base and the tip.

3. The pill carrier of claim 1, wherein one of the limiting walls of the recess comprises a surface section that has the shape of a section of the circumferential surface of a cylinder, and a side wall of the receiving body is provided, which ends in an edge of the receiving body, wherein the edge being moved along the surface section when the receiving body is pivoted about the pivot axis (A).

4. The pill carrier of claim 1, further comprising a spring element which, when a receiving body is pivoted out of the closed position, exerts a restoring force on the receiving body in the direction of the closed position.

5. The pill carrier of claim 1, wherein a status signal light is provided in the base body besides a recess.

6. A filling device for a pill carrier according to claim 1, comprising a receptacle for the pill carrier and a plunger, wherein the plunger can be moved in a direction towards the receptacle by a movement in a pushing direction and/or the receptacle can be moved in a direction towards the plunger by a movement against the pushing direction.

7. The filling device of claim 6, further comprising a circulating belt, a nub being provided on the belt, which can be moved by the belt into a position relative to the plunger in which the nub lifts the plunger.

8. The filling device of claim 6, further comprising a plunger carrier in which the plunger is mounted, wherein the plunger carrier can be moved relative to the receptacle in a direction that is at an angle to the pushing direction, and/or a receiving frame in which the receptacle for the pill carrier is formed, wherein the receiving frame can be moved relative to the plunger in a direction that is at an angle to the pushing direction.

9. A system comprising:

a pill carrier for the intermediate transport of pills in a blister packaging process;

a filling device having a receptacle for the pill carrier and a plunger;

wherein the pill carrier comprises:

a base body; and a plurality of recesses, wherein the recesses are defined by limiting walls and comprise a bottom opening;

wherein a receiving body is provided in each recess between the limiting walls;

wherein the receiving body comprises a receiving space for receiving one or a small number of pills, wherein the receiving space comprises an opening on one side which allows said one or small number of pills to be inserted into the receiving space, and the receiving body is arranged in the recess such that the receiving body can be pivoted about a pivot axis (A), wherein the receiving body can be pivoted from a closed position, in which the opening is arranged opposite one of the limiting walls and is thereby closed, into an open position, in which the opening is at least partially aligned with the bottom opening;

wherein the plunger can be moved in a direction towards the receptacle by a movement in a pushing direction and/or the receptacle can be moved in a direction towards the plunger by a movement against the pushing direction; and wherein the plunger can be brought into contact with the receiving body by a movement in a pushing direction and can pivot the receiving body out of a closed position into an open position.

10. A method for filling a pill carrier, the pill carrier comprising:

a base body; and a plurality of recesses, wherein the recesses are defined by limiting walls and comprise a bottom opening;

wherein a receiving body is provided in the respective recess;

wherein the receiving body comprises a receiving space for receiving one or a small number of pills, wherein the receiving space comprises an opening on one side which allows said one or small number of pills to be inserted into the receiving space, and the receiving body is arranged in the recess such that the receiving body can be pivoted about a pivot axis (A), wherein the receiving body can be pivoted from a closed position, in which the opening is arranged opposite one of the limiting walls and is thereby closed, into an open position, in which the opening is at least partially aligned with the bottom opening:

the method comprising:

providing a receptacle for the pill carrier and a plunger;

locating the pill carrier in the receptacle; and providing a plunger movable in a direction towards the receptacle by a movement in a pushing direction and/or the receptacle movable in a direction towards the plunger by a movement against the pushing direction;

moving the plunger in the pushing direction so as to bring into contact with the receiving body and by further moving the plunger in the pushing direction, the receiving body is pivoted out of the closed position into the open position, whereby the opening of the receiving body is at least partially aligned with the bottom opening of the pill carrier, and whereby, when the opening of the receiving body is at least partially aligned with the bottom opening, a pill is introduced through the bottom opening and the opening of the receiving body into the receiving space.

* * * * *